United States Patent [19]

Kistner, Sr.

[11] Patent Number: 4,670,037

[45] Date of Patent: Jun. 2, 1987

[54] FERTILIZER UTILIZING A CHITIN-PRODUCING FUNGUS AND METHOD FOR ITS USE

[76] Inventor: Harold E. Kistner, Sr., 1500 W. Matlock, #22, Aransas Pass, Tex. 78336

[21] Appl. No.: 764,932

[22] Filed: Aug. 12, 1985

[51] Int. Cl.$^4$ ............................................. C05F 11/08
[52] U.S. Cl. ................................................ 71/1; 71/6; 71/7; 435/918
[58] Field of Search ............... 426/331, 634, 807; 47/57.6, DIG. 9, DIG. 10; 71/1, 6, 7; 435/171, 915, 918; 424/115

[56] References Cited

U.S. PATENT DOCUMENTS 3,115,404 12/1963 Carney ..................................... 71/6

*Primary Examiner*—Ferris H. Lander
*Attorney, Agent, or Firm*—Pearne, Gordon, McCoy & Granger

[57] ABSTRACT

A novel natural fertilizer and method of its use are provided. The fertilizer acts to increase the yield of food crop producing plants. The fertilizer comprises less than 0.05% of an active agent in a stable carrier that is non-toxic to the plants and the active agent. The active agent is a fungus of the genus *Aspergillus*. The fertilizer can be used by coating the seeds of the food crop producing plant at or prior to the time of planting by dusting the ends of a cut plant, by dusting the roots of a seedling, or by treating the soil in which the plant will be grown.

6 Claims, No Drawings

FERTILIZER UTILIZING A CHITIN-PRODUCING FUNGUS AND METHOD FOR ITS USE

BACKGROUND OF THE INVENTION

The invention relates to fertilizers and plant growth and yield promoters, and to processes for the use of these products.

Fertilizers and plant growth and yield promoters have long been used to increase plant growth and crop yield. While mankind first used natural products, such as waste products, as fertilizers, the use of synthesized fertilizers has become increasingly prevalent. This proliferation of synthetic fertilizers has given rise to concern for the health of individuals and ecological systems exposed to these products and to the by-products from their production.

The present invention responds to these concerns by providing a fertilizer having an active agent which occurs naturally, which has been shown causes significant increases in plant growth and crop yields, and which is relatively economical and convenient to use. The active agent is a fungus of the genus *Aspergillus*.

DISCUSSION OF THE PRIOR ART

Naturally occurring products have long been used as fertilizers and plant growth promoters. Such products have included manure, fish products, and crop residues.

Another example of naturally occurring products that are used in agricultural science are certain strains of bacteria. It is understood that the addition of bacteria such as Rhizobia and Azotobacter can aid plants in the breakdown of soil materials to form plant nutrients, as well as in the in fixation of atmospheric nitrogen. An example of a teaching illustrating this is found in U.S. Pat. No. 4,061,488 to Mann, which teaches methods of using a plant treating mixture incorporating spores of *Bacillus uniflagellatus.*

It has been recognized as well that certain types of fungus or their products can be used by agronomists. U.S. Pat. No. 4,370,351 relates to a method of producing a food or feed product, such as a cereal grain, which has been treated with a spawn culture of Pleurotus to increase the protein content of the food.

It is also known that the genus of fungi used in the present invention, Aspergillus, can be useful for agricultural purposes. U.S. Pat. No. 3,043,748, having the same inventor as the present invention, discloses a product resulting from the fermentation of sucrose by *Aspergillus flavus-oryzae,* which serves as a growth-promoting substance.

OBJECTS AND SUMMARY OF THE INVENTION

It is an object of the present invention to provide a new fertilizer or plant yield and growth promoter particularly useful for commercial plants such as commercial crop producers.

It is another object of the invention to provide methods for the use of the new fertilizer.

The fertilizer of the present invention concerns the use of fungus as the active agent. It is believed that all chitin-producing fungi may be used in accordance with the invention as a fertilizer. However, the strains of fungi which have been demonstrated to be useful are from the Euascomycetae subclass of Asomycetes, and specifically of the genus Aspergillus, and most specifically of the species *Aspergillus flavus-oryzae.*

To produce the fertilizer of the present invention, the fungus is first isolated by plating the desired strains of fungi on a suitable sterilized bacteriological medium, such as Czapek-Dox medium with agar. Pure cultures of the desired fungi are then grown from the plated culture. These cultures can be grown in a customary manner, e.g., in a medium of wheat bran, or the cultures can be grown in distilled water that is aerated with air and $CO_2$. The resultant cultures are used as the active agent of the present invention. The active agent is standardized by determination of glucose fermented or alcohol produced by fermentation of a given amount of fermentable material by a given amount of mold spore culture over a given period of time. After standardization, the active agent is added to a carrier at the proper ratio for fertilizer use.

The process for use of the fertilizer of the present invention includes coating seed or dusting the roots of seedlings or the cut ends of a plant with the fertilizer, as well as treatment of the soil or other growth media.

DETAILED DESCRIPTION OF THE PREFERRED EMBODIMENT

The fertilizers or plant yield and growth promoters of the present invention utilize a fungus as the active agent. It is believed that the specified fungi are effective as fertilizers, due to their ability to fix nitrogen from the air and to incorporate it into chitin. Chitin is a polysaccharide consisting predominantly of unbranched chains of (1-4)-2 acetamido-2-deoxy-D-glucose, and is a fundamental component of the cell walls of certain fungi.

It is believed that chitin provides a biologically susceptible medium which plants are able to manipulate to their own advantage and for other plants in their habitat by biological activities including, for example, agglutination and breakdown by enzymatic activity. These enzymes are produced by bacteria in the soil or by the fungus itself, and are also found in the seeds of plants.

According to this belief, all chitin-producing fungi, as well as pure chitin, would behave as an effective fertilizer or plant growth promoter in accordance with the invention. It was reported by Jose-Rutz-Herrera, in his article "The Distribution and Quantitative Importance of Chitin in Fungi," from the "Proceedings of the First International Conference on Chitin-Chitosan," Massachusetts Institute of Technology, Cambridge, Mass., 1978, that Euascomycetes are the fungi with the highest content of chitin, and further that the highest value corresponds to *Aspergillus oryzae.* It is believed that Euascomycetes would generally be operative in accordance with the invention, and that the genus Aspergillus is particularly well suited. In particular, the fungi useful for this invention are of the genus Aspergillus, and preferably the species *Aspergillus flavus-oryzae, Aspergillus wentii,* and *Aspergillus tamarii,* and more preferably *Aspergillus flavus-oryzae.* A strain of this fungus which has been proven very effective is NRRL 458, a culture of which is on deposit at the Northern Utilization Branch at Peoria, Ill.

The isolation of the culture is accomplished by the following method. Materials which may be a source of the desired strains of fungus are plated out on a suitable bacteriological medium favorable for the development of fungus. A suitable medium for this use is Czapek-Dox medium with agar. This medium consists of $NaNO_3$, 3 grams; $K_2HOP_4$, 1 gram; $MgSO_4.7H_2O$, 0.5 gram; KCl, 0.5 gram; FeSO$_4$.7H$_2$O, 0.01 gram; sucrose, 30.0 grams and agar 15.0 grams in 1 liter of water. The culture is introduced to a medium which has been sterilized at 15 pounds pressure for 15 minutes. The culture is incubated for two to three days at 25° C. The various fungal colonies can then be easily detected by a trained observer, and are transferred from the medium to a suitable growth medium.

Following isolation, the pure culture is added to a suitable growth medium to produce a sufficient quantity of active agent. For one method of growth, the culture is added by air flotation to a flask or other container containing sterilized, deionized distilled water through which air and carbon dioxide are bubbled. The culture is grown in this environment for two to three days at 28° C. This ability to grow in distilled water aerated with nitrogen and carbon dioxide demonstrates the culture's ability to fix nitrogen from the atmosphere and to utilize carbon dioxide as an energy source, since no other source of nitrogen or carbon dioxide is available to the fungus. The culture which results from this method is separated from the water as by filtration or evaporation and is used as the active agent for the present invention.

A second method of growing the culture involves growing the pure culture in a known growth medium such as wheat bran moistened with hydrochloric acid. The medium may be inoculated with the culture, such as by air-floating the mold spores into a flask containing the medium. The culture is incubated at 20° to 25° C. in an upright flask until rapid growth is completed and the culture material, i.e., the culture and residual growth medium, will remain caked in the bottom when laid flat. The culture material is allowed to dry to produce the active agent.

After the active agent has been produced, it is standardized to determine the efficiency of the material per unit weight. Standardization may be accomplished such as by fermentation of a carbohydrate. Starch is a suitable carbohydrate for fermentation and the procedure is as follows. A standard amount of finely ground corn is placed in a flask and distilled water is added. The corn mixture is autoclaved at 15 pounds of pressure for 15 minutes. The mixture is allowed to cool to 61° C. and a standard amount of culture is added. This is allowed to cool to 28° C. This temperature is maintained for 36 hours. The weight is recorded when the mixture comes to 28° C., and from then at 12-hour intervals for 60 hours. The weight lost corresponds to the weight of carbon dioxide lost. This value can be used to determine the glucose equivalent fermented. A sample of corn mixture which was not treated with the mold culture is also tested in this manner to determine the amount of fermentable sugars in the material being fermented. The active agent is deemed acceptable for the proportions given for the fertilizer if the outlined fermentation process using 56 grams of corn and 1 gram of culture mixture results in 12 to 14 grams of carbon dioxide produced for a 60-hour period.

To form the fertilizer, the standardized active agent is mixed with a carrier. The carrier is a substance used for the dispersement and application of the active agent. The carrier should be inert, stable for prolonged storage, non-toxic to the culture material and to the plants, and further should act to adhere the active agent to the plant which is treated. Very fine particulate has been found to be quite suitable, although it is envisioned that viscous liquids might also be used. Examples of suitable carriers are finely ground calcium carbonate, talc, and silt or the material washed from sand. An example of a material which has been found to be unsuitable as a carrier is wheat middlings. It is believed that this substance results in agglutination by the mold.

The fertilizer should contain 5 to 500 parts per million parts (i.e., 0.0005% to 0.05%) of active agent, and preferably 5 to 100 parts per million (i.e., 0.0005% to 0.01%), and most preferably 10 to 50 parts of active agent per million (i.e., 0.001% to 0.005%). Other plant growth additives which do not interfere with the intended activity of the active agent may be added. Trace elements would be an example of such additives.

The fertilizer may be used in various ways. Seeds may be coated at planting time or before planting time with sufficient fertilizer to coat the seed. The exact amount of fertilizer necessary to coat the seed will vary with the size of the seed. Smaller seeds will require more, since they have a greater surface area. One-half cup of growth-promoter is sufficient to coat one bushel of seed corn.

It is also possible to dust the cut ends of plant cuttings before planting. Plants that may be planted in this manner include agricultural crops such as potatoes, or even houseplants that are grown in this manner.

The growth-promoter may be dusted on the roots of seedlings which will be transplanted, such as tomatoes or cabbage. The growth-promoter may be applied, as by dusting the tilled field, to the soil prior to planting.

The following examples demonstrate the products, use, and effectiveness of the growth-promoter of the present invention.

EXAMPLE 1

Production of the active agent for the fertilizer of the present invention can be accomplished as follows.

A culture of *Aspergillus flavus-oryzae*, NRRL 458, is isolated by use of Czapek-Dox medium with agar. This strain of fungi is on deposit at the Northern Utilization Branch at Peoria, Ill. The Czapek-Dox medium consists of NaNo$_3$, 3.0 grams; K$_2$HPO$_4$, 1.0 gram; MgSO$_4$.7H$_2$O, 0.5 gram; KCl, 0.5 gram; FeSO$_4$.7H$_2$O, 0.01 gram; sucrose 30.0 grams; and agar 15.0 grams in 1 liter distilled water. All components are of reagent grade. This medium is sterilized at 15 pounds pressure for 15 minutes. The medium is inoculated with spores of the mold culture and is subsequently incubated at 25° C. for two to three days. Single colonies of the culture will develop and isolated mold spores can be selected by a trained observer.

The culture material that acts as the active agent can be prepared from the isolated mold spores by either of two methods. The culture material may be grown in sterilized, distilled water that is aerated with air and carbon dioxide gas, or the culture material may be grown in any suitable carbohydrate medium, such as wheat bran.

To cause growth in water, isolated mold spores are introduced to sterilized, deionized distilled water in a flask by air flotation of spores into the water. Air and carbon dioxide are bubbled through the water and mold mixture. The mixture is incubated at 28° C. until a sufficient quantity of culture material has grown. The culture material is separated from the water by filtration, decanting or evaporation. This is used as the active agent.

For the second growth method, isolated mold spores are air-floated into a 500 milliliter flask containing 32 grams of wheat bran which has been moistened with 16 milliliters of 0.1 normal hydrochloric acid. The inoculated bran is incubated at 20° to 25° C. The flasks should be left upright until rapid growth is completed, specifically when the material will remain caked in the bottom when laid flat. This material is allowed to dry. The dried material is used as the active agent. It consists of fungus and any residual bran.

In order to assure that the proper amount of active agent is added to the carrier for the maximum efficiency, a sample of the active agent is tested. This standardization procedure can be accomplished by the fermentation of starch. Fifty-six grams of finely ground corn is placed in a 500 milliliter flask to which 250 milliliters of distilled water is added. This mixture is autoclaved at 15 pounds of pressure for 15 minutes. The mixture is allowed to cool to 61° C. and one gram of mold spore culture is added to the mixture. This is cultured with yeast at 28° C. This temperature is maintained until the growth medium is spent. The weight loss is measured every 12 hours.

In order to determine the glucose which is produced by the enzyme activity of the mold spore culture, a control is also run which was not treated with mold spore culture. The weight loss for the control represents the amount of fermentable sugar native to the corn. This value is subtracted from the weight loss for the treated sample. The weight of the carbon dioxide produced equals 95.5% of the value of the alcohol produced. The weight of the alcohol produced equals 51.1% of the value of the glucose fermented. Thus, the weight of the carbon dioxide produced equals 48.9% of the glucose fermented.

It has been determined that 20 to 30 parts per million of active agent in the carrier is the optimal level when the sample which has been standardized results in the production of 12–14 grams of carbon dioxide over a 60-hour period.

EXAMPLE 2

This and the following examples illustrate methods of using the invention, and demonstrate the efficacy of the present invention.

Active agent was isolated and prepared by growth in wheat bran as described above. The active agent was mixed, 25 parts per million active agent in a horizontal mixer to form a substantially uniform dispersement with a carrier of fine silt which was washed from alluvial deposit to form the fertilizer of the present invention. This carrier is also referred to as sand washings.

A field test was conducted comparing the crop yield and the root growth of Lincoln pea plants grown from treated seeds with those of Lincoln pea plants grown from non-treated seeds. The seeds were treated with the fertilizer by coating the seeds. Two 13-foot rows of treated seed were planted intermediate two 13-foot rows of untreated seed used as a control. Rows I and IV were the control rows. Twenty-four inch netting was placed over the seeds to protect the plants from pests. The peas were allowed to mature and the peas were harvested every other day, three times. The yield is shown below.

| | Yield in Pounds | | | |
|---|---|---|---|---|
| | Control | | Treated Seeds | |
| | Row I | Row IV | Row II | Row III |
| First Harvest | 0.90 | 1.40 | 1.30 | 1.70 |

-continued

| | Yield in Pounds | | | |
|---|---|---|---|---|
| | Control | | Treated Seeds | |
| | Row I | Row IV | Row II | Row III |
| Second Harvest | 0.25 | 0.75 | 0.85 | 0.50 |
| Third Harvest | 0.00 | 0.10 | 0.00 | 0.20 |
| | 1.15 | 2.25 | 2.15 | 2.40 |

The total yield for the control was 3.40 pounds, while the total yield for the treated seeds was 4.55 pounds. This represents a 33.8% increase in yield for the treated plants.

At the bloom stage and after harvest, a number of plants were carefully removed from the soil. The dirt was carefully cleaned from the roots so that the root system and the nodules on the root system were not disturbed. The roots were dried and mounted for comparison of the root system and the nodules. Nodules are round swellings on a root which are inhabited by symbiotic bacteria. These bacteria help the plant to assimilate needed nutrients, most notably nitrogen. Thus, an increased nodule count indicates a greater ability to assimilate nitrogen. This in turn contributes to greater crop yield.

Comparison of the roots of the treated and the control plants both at the bloom stage and the mature stage shows a greater root development and greater development of nodules in the treated plant.

EXAMPLES 3–5

Similar field tests were conducted for red beets, carrots, and popcorn. The tables below represent the percentage weight increase for the plants treated with the fertilizer at 25 ppm *Aspergillus flavus-oryzae* active agent in sand washings as compared to an untreated control grown at the same period in the same soil conditions in a neighboring plot.

| Plant | Percentage Yield Increase (by weight) |
|---|---|
| Red beets | 50.0% |
| Carrots | 37.5% |
| Popcorn | 33.3% |

Comparative photographs of the resultant crops illustrate that the individual vegetables yielded from the treated plants were generally larger than the vegetables of the control plants.

EXAMPLE 6

A similar field test was conducted for Pontiac potatoes. The test crop was produced from cuttings dusted at the fresh cut end with a fertilizer having 25 ppm *Aspergillus flavus oryzae* active agent in sand washings. A control crop was grown in a neighboring plot from untreated cuttings. The treated plants yielded 18.8% by weight more potatoes than the control plants. Once again, comparative photographs illustrate that the treated plants yielded a generally higher quality product than the control plants.

EXAMPLE 7

A similar field test was conducted for Tendergreen beans. The test crop was grown from seeds coated with 25 ppm *Aspergillus flavus oryzae* active agent in sand washings. The control crop was grown at the same period in a neighboring plot. After several weeks, young plants were removed from the ground and the dirt was carefully removed from the root system. Care was taken not to disturb root hairs and nodules on the roots. The roots were carefully dried and mounted for comparison. A comparison between the estimated number of visible nodules per plant on test plants and on treated plants is seen below.

| IMMATURE PLANTS | | | |
|---|---|---|---|
| Plain Plants | Nodule Count | Treated Plants | Nodule Count |
| Control 1 | 48–58 | Test 1 | 56–66 |
| Control 2 | 6–16 | Test 2 | 18–28 |
| Control 3 | 16–26 | Test 3 | 36–46 |

About four weeks later, mature plants were similarly removed from the ground. The dirt was carefully removed from the root system. The roots were dried and mounted for comparison. Because of more extensive root system, it was difficult to estimate the number of nodules for the plants; however, the treated plant appeared to have significantly more nodules than the control and, further, to have a more extensive root system.

EXAMPLE 8

A similar field test was conducted for Great Northern Beans. Test plants were grown from seed dusted with fertilizer of the invention containing 25 ppm of *Aspergillus flavus oryzae* active agent in sand washings. The control plants were grown from untreated seed in a neighboring plot under the same conditions as the test plants. The treated plants yielded a 33.3% increase by weight in the yield.

After harvest, plants were carefully removed from the soil and the dirt was removed from the root system for a comparison of the roots of treated versus untreated plants, as in Examples 1 and 7. The treated plant demonstrated a significant increase in the root growth, as well as in the number of nodules present.

EXAMPLE 9

A laboratory test was conducted comparing germination of hybrid seed corn coated with the fertilizer of the present invention at varying levels of active agent. The corn was allowed to germinate in filter paper, kept moist with sterilized distilled water. The test was conducted with plain corn and with corn treated with *Aspergillus flavus oryzae* active agent at 20 ppm, 25 ppm, and 30 ppm in sand washings. After two weeks of growth, the seedlings were mounted on graph paper and allowed to dry. Measurements were taken of the root and stalk growth for ten seedlings for each group. The results are shown below. The measurements are in centimeters ±0.4 centimeters.

| Kernel | Control Stalk/Root Growth | 20 ppm Stalk/Root Growth | 25 ppm Stalk/Root Growth | 30 ppm Stalk/Root Growth |
|---|---|---|---|---|
| 1 | 4.8/1.8 | 5.0/1.2 | 5.0/13.2 | 5.0/5.6 |
| 2 | 4.4/2.0 | 4.6/6.4 | 5.8/6.4 | 4.6/2.4 |
| 3 | 4.6/0.2 | 4.2/8.6 | 5.4/7.0 | 3.6/2.0 |
| 4 | 3.6/3.8 | 3.6/2.0 | 5.6/3.0 | 2.0/3.4 |
| 5 | 2.8/3.4 | 3.2/6.0 | 5.2/8.4 | 4.2/4.8 |
| 6 | 2.2/0.2 | 3.4/4.0 | 4.4/8.0 | 3.2/2.4 |
| 7 | 2.2/0.4 | 3.0/5.6 | 4.5/9.4 | 3.2/4.2 |
| 8 | 2.8/3.0 | 2.4/2.0 | 4.0/7.4 | 2.5/0 |
| 9 | — | 1.6/0 | 4.0/7.4 | 1.2/1.8 |
| 10 | — | 1.2/2.3 | 2.4/6.4 | 1.5/2.8 |

The increase in root and stalk growth for the treated seeds was striking. The test demonstrates that the optimal level of active agent was 25 ppm.

The foregoing examples show that the fertilizer in accordance with the invention is an effective fertilizer and plant growth and yield promoter.

Although the preferred embodiment of this invention has been shown and described, it should be understood that various modifications may be resorted to without departing from the scope of the invention as disclosed and claimed herein.

What is claimed is:

1. A fertilizer which produces increased yields of a food crop producing plant, which comprises less than 0.05% of an active agent consisting of a fungus of the species *Aspergillus Flavus Oryzae* which can be grown at temperatures up to 30° C. and possesses the ability to fix nitrogen and to incorporate it into chitin, the active agent being substantially uniformly dispersed in a carrier that is stable during storage and non-toxic to the plant wherein the carrier is chosen from the group consisting of finely ground calcium carbonate, talc, sand, sand washings, and silt.

2. A method for increasing the yield of a food crop yielding plant which comprises treating the food crop yielding plant with an effective amount of fertilizer to cause an increase in the food crop yield, the fertilizer comprising less than 0.05% of an active agent consisting of a fungus of the species *Aspergillus Flavus Oryzae* which can be grown at temperatures up to 30° C. and possesses the ability to fix nitrogen and to incorporate it into chitin, the active agent being substantially uniformly dispersed in a carrier that is stable during storage and non-toxic to the plant.

3. A method in accordance with claim 2, wherein the plant is grown from seed, and the seed is coated with the fertilizer.

4. A method in accordance with claim 2, wherein the plant is grown from a cutting having a cut end and the cut end of the cutting is dusted with the fertilizer.

5. A method in accordance with claim 2, wherein the plant is grown from a seedling having roots, and the fertilizer is dusted on the roots of the seedling.

6. A method for increasing the yield of a food crop yielding plant which comprises treating the soil in which the food crop yielding plant is grown with a fertilizer, the fertilizer comprising less than 0.5% of an active agent consisting of a fungus of the species *Aspergillus Flavus Oryzae* which can be grown at temperatures up to 30° C. and possesses the ability to fix nitrogen and to incorporate it into chitin, the active agent being substantially uniformly dispersed in a carrier that is stable during storage and non-toxic to the plant.

* * * * *